(12) United States Patent
Tran

(10) Patent No.: US 10,535,070 B2
(45) Date of Patent: Jan. 14, 2020

(54) SERVICE PROVIDER SYSTEM AND METHOD FOR MARKETING PROGRAMS

(71) Applicant: Hung Tran, Chicago, IL (US)

(72) Inventor: Hung Tran, Chicago, IL (US)

(73) Assignee: TransX Systems, Inc., Chicago, IL (US)

( * ) Notice: Subject to any disclaimer, the term of this patent is extended or adjusted under 35 U.S.C. 154(b) by 0 days.

(21) Appl. No.: 15/997,928

(22) Filed: Jun. 5, 2018

(65) Prior Publication Data

US 2018/0308104 A1    Oct. 25, 2018

Related U.S. Application Data

(63) Continuation of application No. 15/801,697, filed on Nov. 2, 2017, which is a continuation of application No. 11/142,916, filed on May 31, 2005, now Pat. No. 9,842,337.

(60) Provisional application No. 60/575,779, filed on May 28, 2004.

(51) Int. Cl.
   *G06Q 30/00* (2012.01)
   *G06Q 30/02* (2012.01)

(52) U.S. Cl.
   CPC ......... *G06Q 30/00* (2013.01); *G06Q 30/0224* (2013.01)

(58) Field of Classification Search
   USPC .................................. 705/14.4, 14.33, 14.34
   See application file for complete search history.

(56) References Cited

U.S. PATENT DOCUMENTS

| | | | |
|---|---|---|---|
| 4,394,725 A | * | 7/1983 | Bienvenu ............ G06F 9/52 718/106 |
| 5,924,080 A | | 7/1999 | Johnson |
| 6,330,543 B1 | | 12/2001 | Kepecs |
| 6,467,686 B1 | | 10/2002 | Guthrie et al. |
| 6,736,322 B2 | | 5/2004 | Gobburu et al. |
| 7,213,254 B2 | | 5/2007 | Koplar et al. |
| 7,257,545 B1 | | 8/2007 | Hung |

(Continued)

FOREIGN PATENT DOCUMENTS

| | | |
|---|---|---|
| WO | WO 00 03328 | 1/2000 |
| WO | WO 00 60517 | 10/2000 |

*Primary Examiner* — Sun M Li
(74) *Attorney, Agent, or Firm* — Morgan, Lewis & Bockius LLP

(57) ABSTRACT

To assist in patent searching a description includes a consumer purchasing behavior profiling system having aspects including consumer profiles formed and updated based on a variety of data. Advertisers access to send targeted advertising messages to the consumers. Aspects include advertising information together with incentive level and mix being correlated with the consumer profile to produce a measure of the applicability of the ad to that consumer and the probability of converting that consumer. Other aspects include determining the mix of ad information, incentive level and type, and product offering that will be required to convert an ad viewer to a buyer. Aspects focus on using wireless devices with consumers. Other aspects reside in methods of using electronic coupons distribution and redemption to collect additional data points necessary to understand the consumer's purchasing decision process and factors that influence the purchasing decision.

7 Claims, 9 Drawing Sheets

MARKETING SYSTEM

(56) References Cited

U.S. PATENT DOCUMENTS

Figure 1:
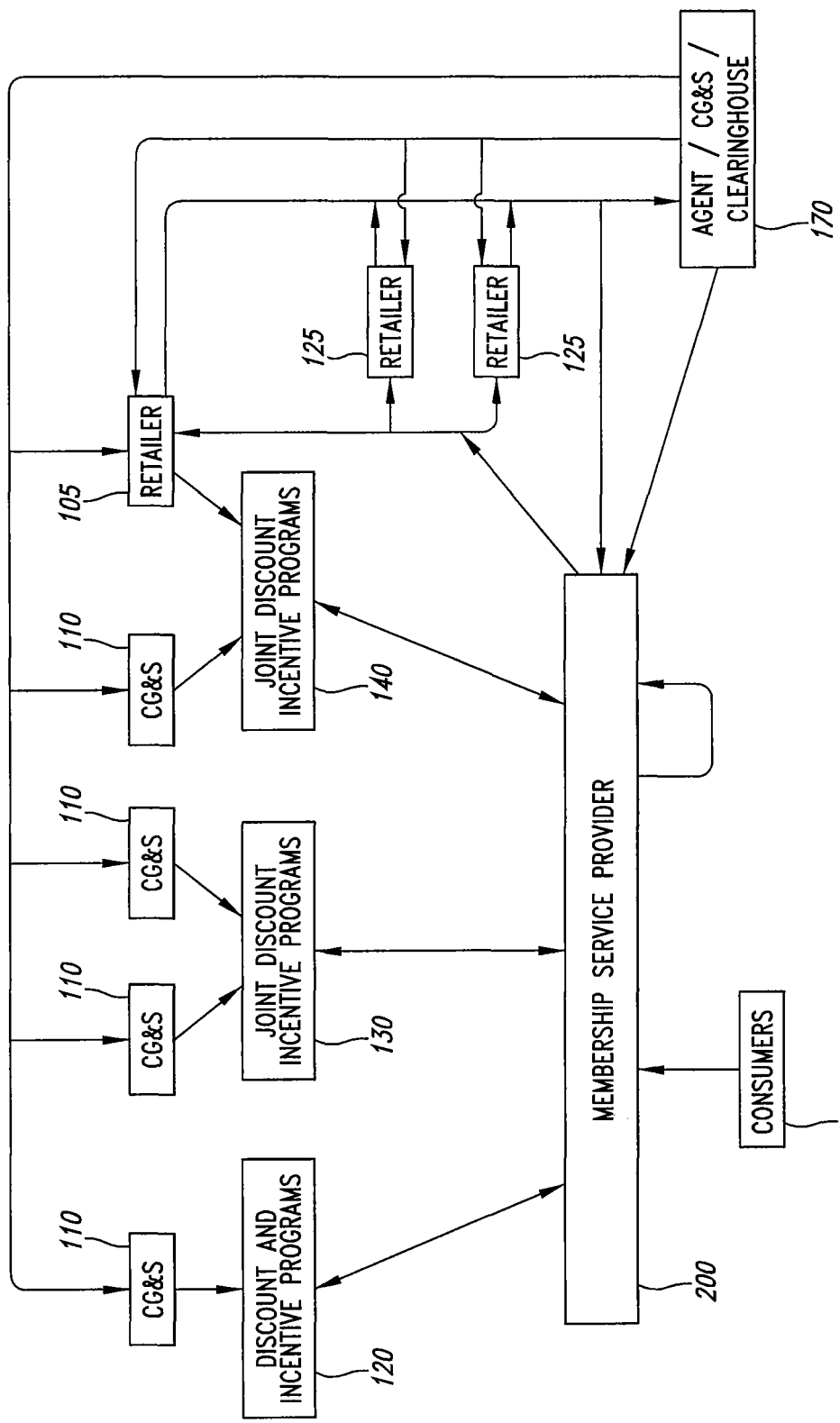

| | | |
|---|---|---|
| 7,308,254 B1 | 12/2007 | Rissanen |
| 7,324,957 B2 | 1/2008 | Boys |
| 2002/0016740 A1 | 2/2002 | Ogasawara |
| 2002/0023027 A1 | 2/2002 | Simonds |
| 2002/0088853 A1* | 7/2002 | Itoh ............... G06Q 20/045 235/382 |
| 2002/0091569 A1 | 7/2002 | Kitaura et al. |
| 2002/0095333 A1 | 7/2002 | Jokinen et al. |
| 2002/0126780 A1* | 9/2002 | Oshima ............... G06Q 20/045 375/347 |
| 2002/0128903 A1 | 9/2002 | Kernahan |
| 2002/0161640 A1 | 10/2002 | Wolfe |
| 2002/0169662 A1 | 11/2002 | Claiborne |
| 2002/0198777 A1 | 12/2002 | Yuasa |
| 2003/0023482 A1 | 1/2003 | Messner et al. |
| 2003/0028426 A1 | 2/2003 | Banerjee et al. |
| 2003/0074259 A1 | 4/2003 | Slyman et al. |
| 2003/0165128 A1 | 9/2003 | Sisodia et al. |
| 2003/0233276 A1 | 12/2003 | Pearlman et al. |
| 2004/0030598 A1 | 2/2004 | Boal |
| 2004/0054575 A1 | 3/2004 | Marshall |
| 2004/0177003 A1 | 9/2004 | Liao et al. |
| 2004/0195321 A1 | 10/2004 | Silverbrook et al. |
| 2004/0254836 A1 | 12/2004 | Barabas et al. |
| 2005/0045728 A1 | 3/2005 | Kargman |
| 2005/0131761 A1 | 6/2005 | Trika et al. |
| 2006/0015404 A1 | 1/2006 | Tran |
| 2006/0015405 A1 | 1/2006 | Bala et al. |
| 2007/0088610 A1 | 4/2007 | Chen |
| 2007/0241189 A1 | 10/2007 | Slavin et al. |
| 2007/0257110 A1 | 11/2007 | Schmidt et al. |
| 2009/0106115 A1 | 4/2009 | James et al. |
| 2009/0132344 A1 | 5/2009 | Otto et al. |
| 2010/0030637 A1 | 2/2010 | Koplar |

* cited by examiner

MARKETING SYSTEM

COUPON REDEMPTION

ADVERTISER'S CREATE NEW CAMPAIGN

INTER-ENTERPRISE MARKETING

UNIVERSAL ID TAG

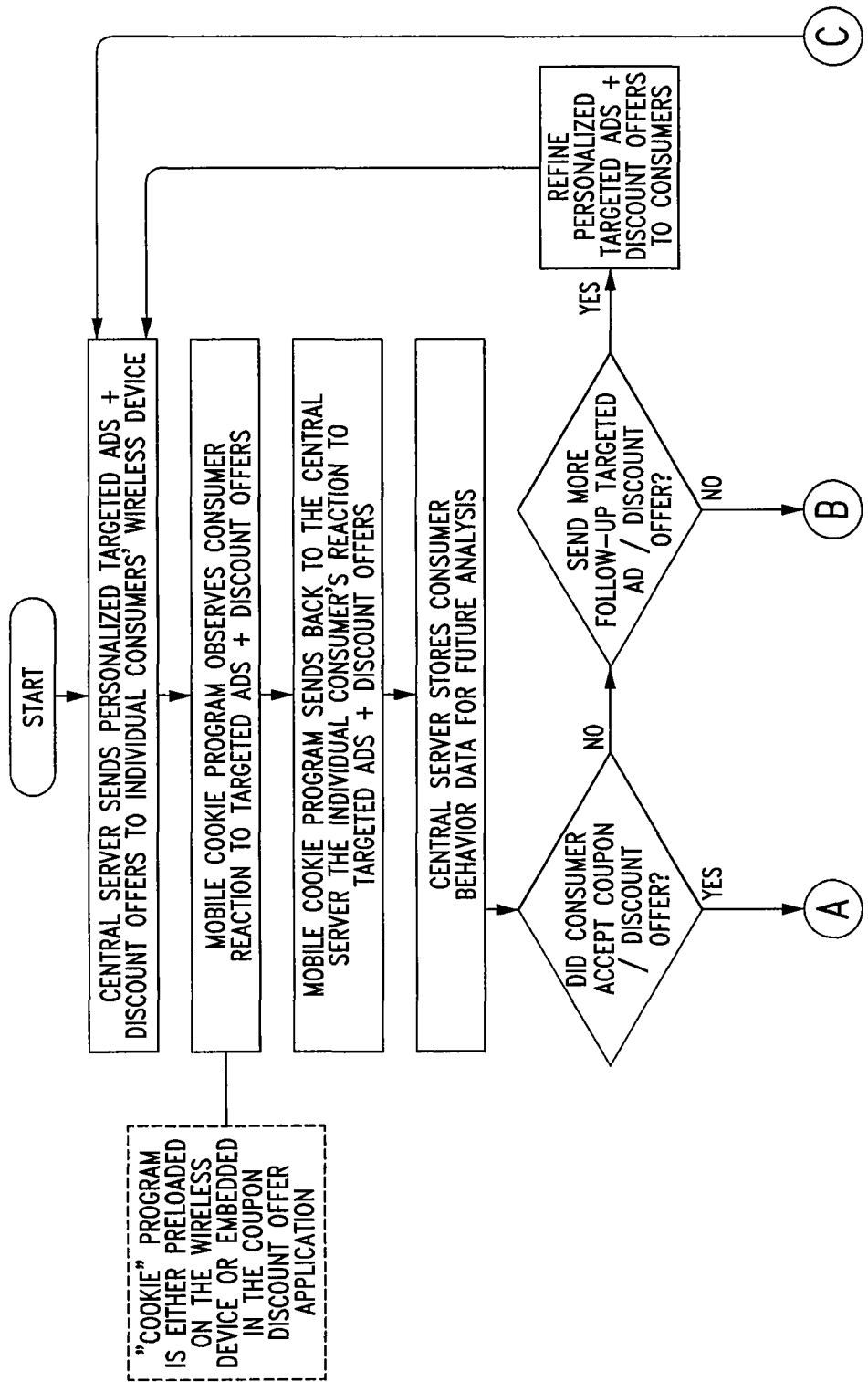
Fig. 6A CONSUMER BEHAVIOR DATA COLLECTION PROCESS

CONSUMER BEHAVIOR DATA COLLECTION PROCESS

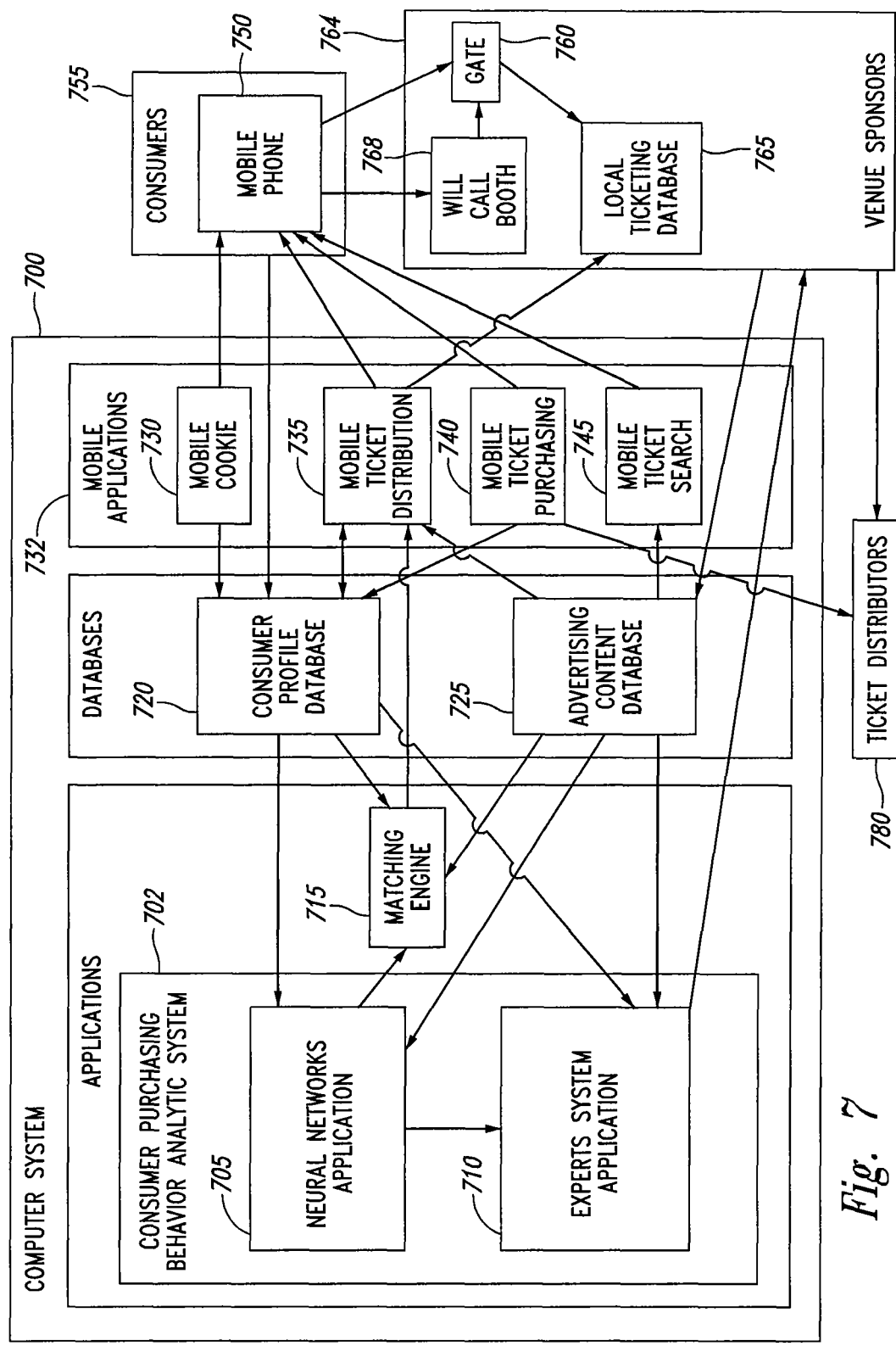

MOBILE COOKIE APPLICATION

SERVICE PROVIDER SYSTEM AND METHOD FOR MARKETING PROGRAMS

RELATED APPLICATIONS

This application is a continuation of U.S. patent application Ser. No. 15/801,697, filed Nov. 2, 2017, which is a continuation of U.S. patent application Ser. No. 11/142,916, filed May 31, 2005, which claims the benefit of and priority to U.S. Provisional Patent Application No. 60/575,779, filed May 28, 2004, the entire disclosure of each of which is hereby incorporated herein by reference.

BACKGROUND OF THE INVENTION

The advent of the Internet has resulted in the ability to communicate data across the globe instantaneously, and will allow for numerous new applications which enhance consumer's lives. One of the enhancements which can occur is the ability for the consumer to receive advertising which is relevant to their lifestyle, rather than a stream of ads determined by the program they are watching. Such "targeted ads" can potentially reduce the amount of unwanted information which consumers receive in the mail, during television programs, and when using the Internet.

From an advertiser's perspective the ability to target ads can be beneficial since they have some confidence that their ad will at least be determined relevant by the consumer, and therefore will not be found annoying because it is not applicable to their lifestyle.

In order to determine the applicability of an advertisement to a consumer, it is necessary to know something about their lifestyle, and in particular to understand their demographics (age, household size, income). In some instances it is useful to know their particular purchasing habits. As an example, a vendor of soups would like to know which consumers are buying their competitor's soup, so that they can target ads at those consumers in an effort to convince them to switch brands. That vendor will probably not want to target loyal customers, although for a new product introduction the strategy may be to convince loyal customers to try the new product. In both cases it is extremely useful for the vendor to be able to determine what brand of product the consumer presently purchases.

There are several difficulties associated with the collection, processing, and storage of consumer data. Collecting consumer data and determining the demographic parameters of the consumer can be difficult. Surveys can be performed, and in some instances the consumer will willingly give access to normally private data including family size, age of family members, and household income. If the consumer does not provide this data directly, the information must be "mined" from various pieces of information which are gathered about the consumer, typically from specific purchases.

Coupons are heavily used as a marketing tool by manufacturers to gain better understanding of consumer purchasing behavior. Coupons are normally distributed to consumers through any one of a number of different channels, including newspapers as Free Standing Insert (FSI) coupons, advertising circulars, direct mailings, e-mail, and the internet. To redeem a coupon, a consumer must present the coupon in connection with the purchase of a product identified on the coupon at a retail establishment. The retailer, upon receiving the coupon, will deduct the face value of the coupon from the total amount owed by the consumer.

Manufacturers generally require retailers to provide the original redeemed coupons along with invoices for reimbursement. Retailers typically bundle redeemed coupons and ship them to third party clearinghouses, which sort the redeemed coupons by product manufacturer. The sorted coupons, together with the retailer invoices, are then shipped to a manufacturer's agent. The manufacturer's agent, which could be a clearinghouse, attempts to determine whether the invoice amount is supported by the redeemed coupons. The manufacturer's agent may issue a check to the retailer through the clearinghouse as reimbursement for the value of the coupons verified by the agent as genuine. Any invoiced amount that is not adequately supported by the provided original coupons will not be paid by the manufacturer or its agent. In a normal processing cycle, retailers usually do not receive reimbursement checks until six to eight weeks after the original coupons were redeemed. Redemption of manufacturer coupons requires retailers to forego receipt of full coupon value for items purchased using a coupon for a significant period of time.

The disadvantages of traditional method of coupon processing include not only significant time delay but also ability to measure the effectiveness of marketing campaign in a timely manner. For instance, manufacturers cannot precisely determine whether a recent sales promotion program has contributed to a bona fide product sale, because traditional methods of coupon redemption do not correlate a specific product sale to each specific redeemed coupon at the time of redemption at a retail store. Additionally, coupons are often bundled together by retail chain rather than by a particular retail outlet, thus, manufacturers receive no information regarding the date and place of redemption or the precise products or product configuration purchased in connection with the redemption of the coupon. Manufacturers have only a general idea of the volume of product sales expected for particular retail chains.

Most of today's coupons are delivered to consumers as printed offers in newspapers and magazines, Free Standing Insert (FSI) in newspapers, components in direct mail advertising programs. They are also given to consumers in stores or are attached to or placed inside product packaging. Typically, the consumer must cut out the coupons, sort them, and present the individual pieces of paper for redemption at the time of purchase. At the point of purchase, each coupon must further be checked to verify that it has not expired. Consumers find coupons to be more hassle than they are worth. Detached or detachable coupons are unkempt and clutter one's pockets or pocket book. Additionally, consumers find that coupons are unorganized and that desired coupons are difficult to find when needed such as when checking out. The disorganized nature of coupons also makes it difficult to keep track of valid coupons such as coupons which have not expired.

Coupons are also used by the entertainment industry to increase ticket sales. The entertainment industry issues over 250 million tickets every year. Over 55% of these tickets went unsold. In today's environment, venue sponsors and event promoters have limited ability to sell tickets within 48 hours prior to the start of the show/event. To make matter worse, artists and performers usually don't allow venue sponsors and event promoters to publicly announce that, one, tickets are still available and, two, discount the ticket price.

BRIEF DESCRIPTION OF THE SEVERAL VIEWS OF THE DRAWING(S)

Figure 2:
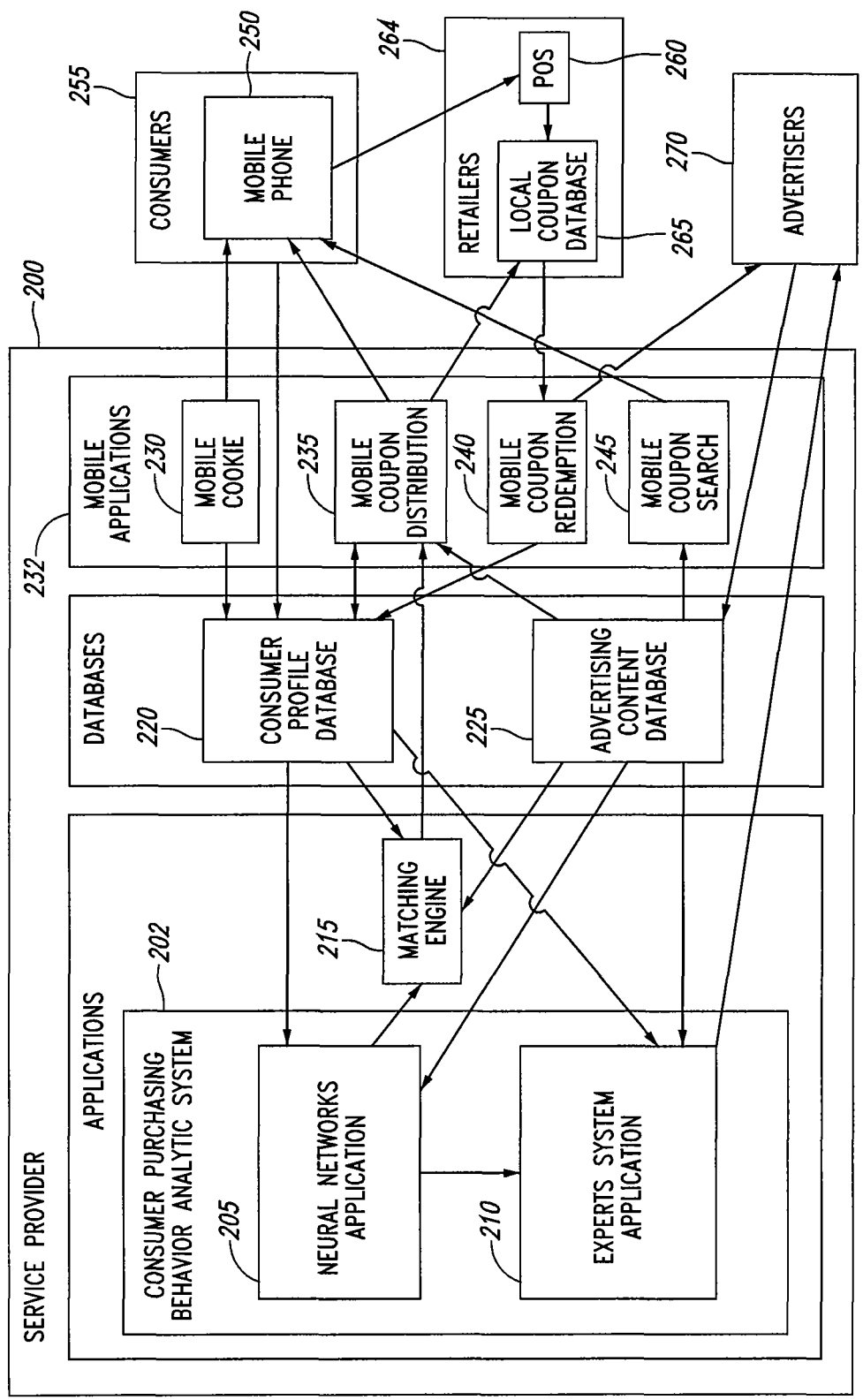
Figure 3:
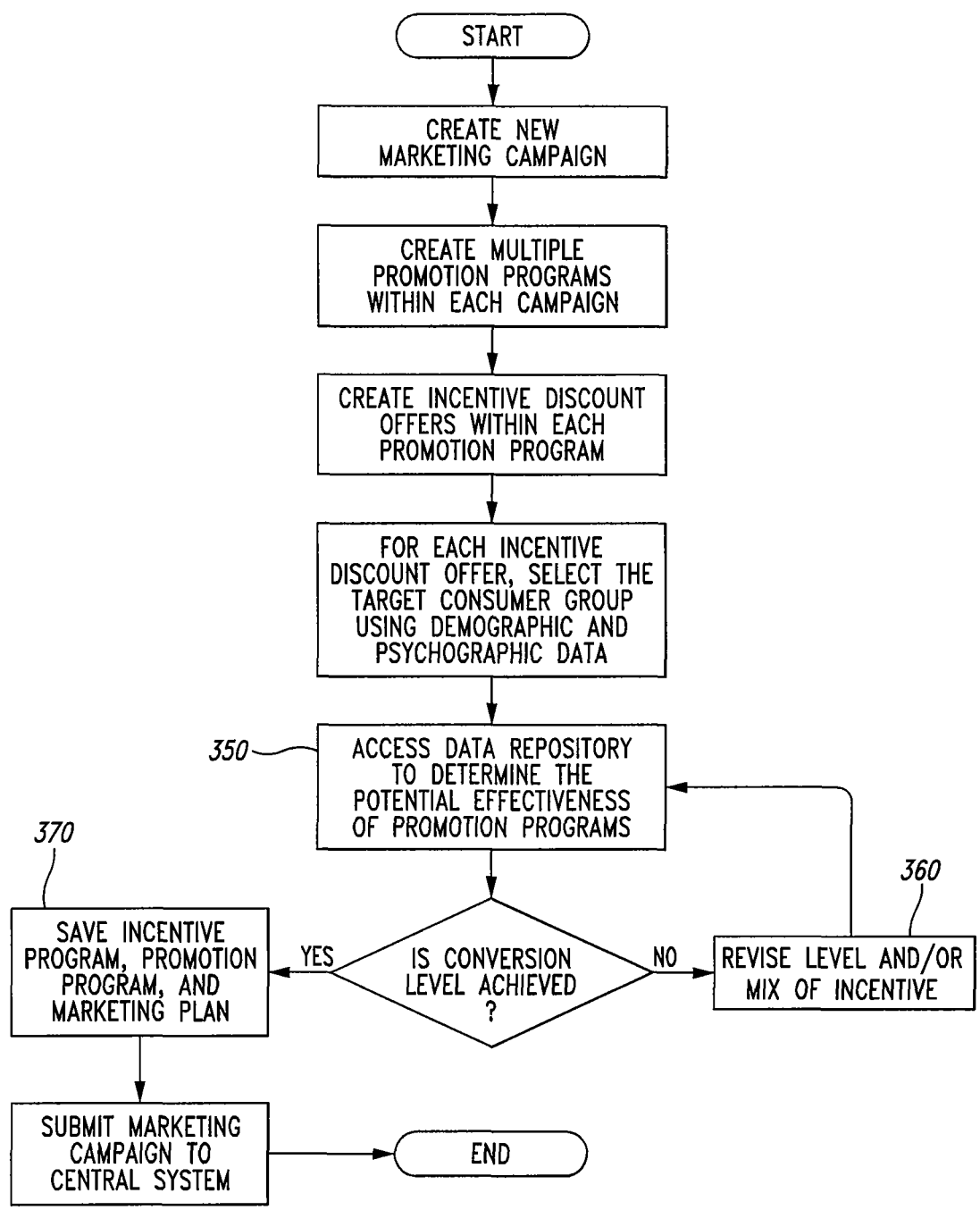
Figure 4:
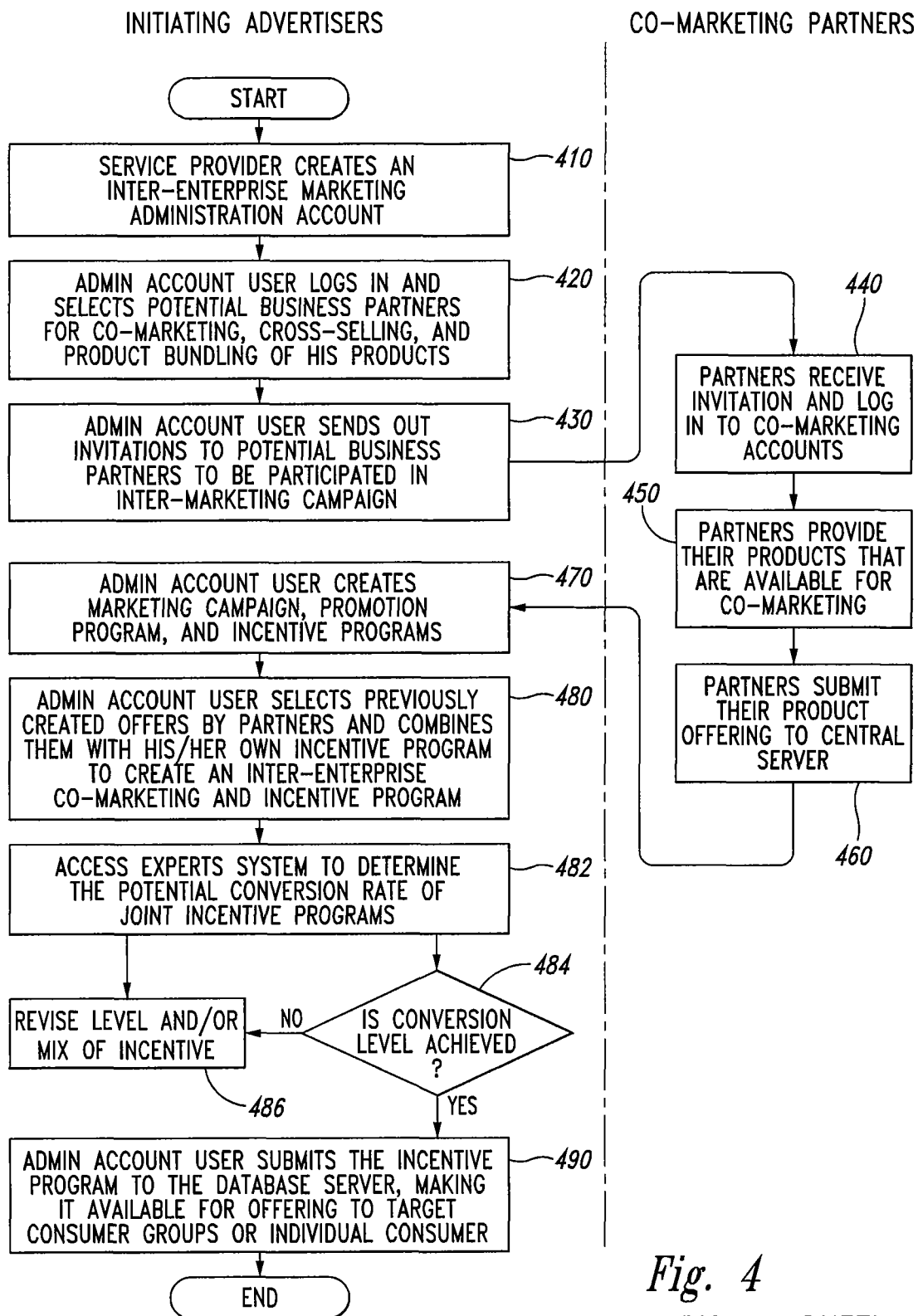
Figure 5:
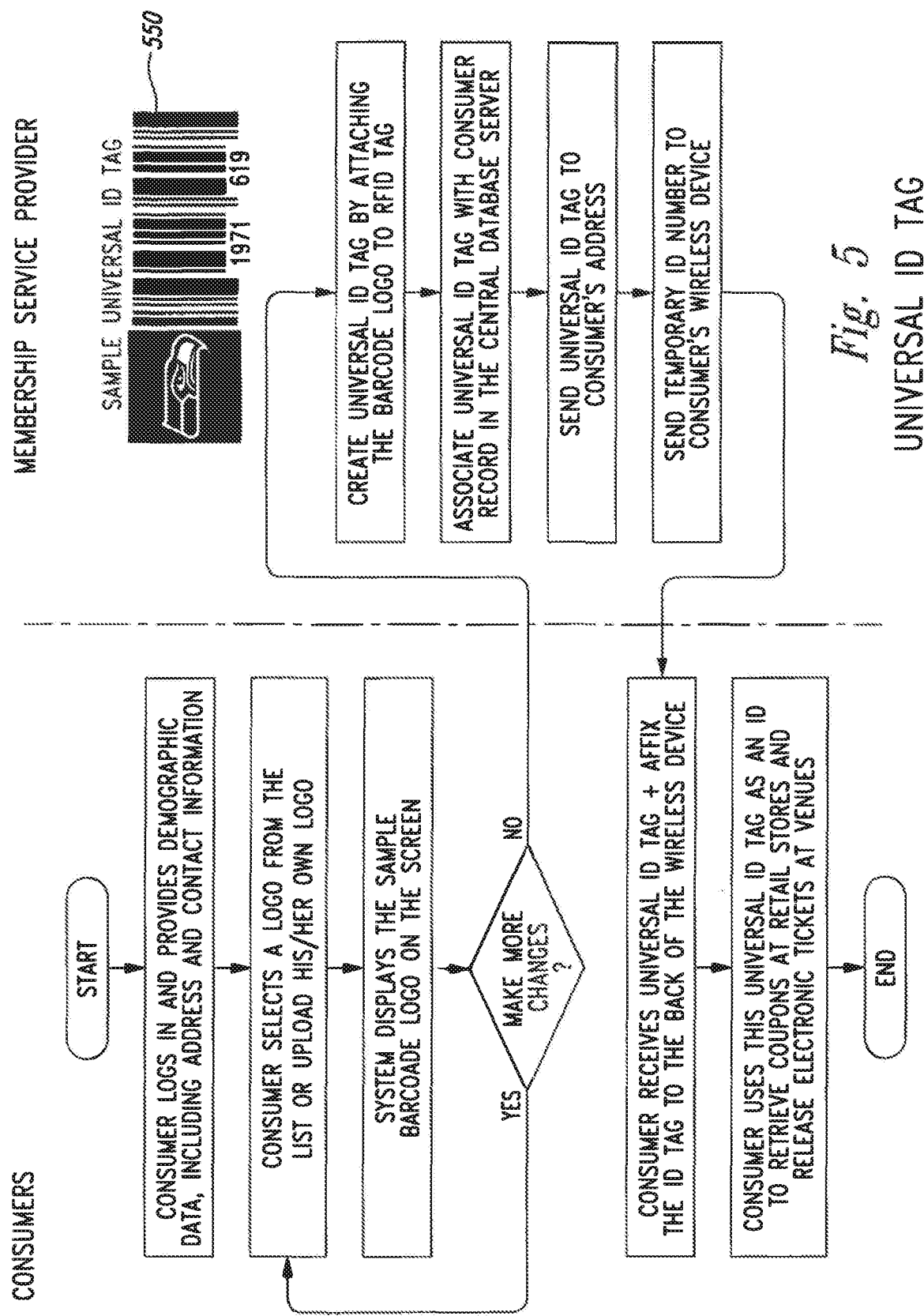
Figure 6B:
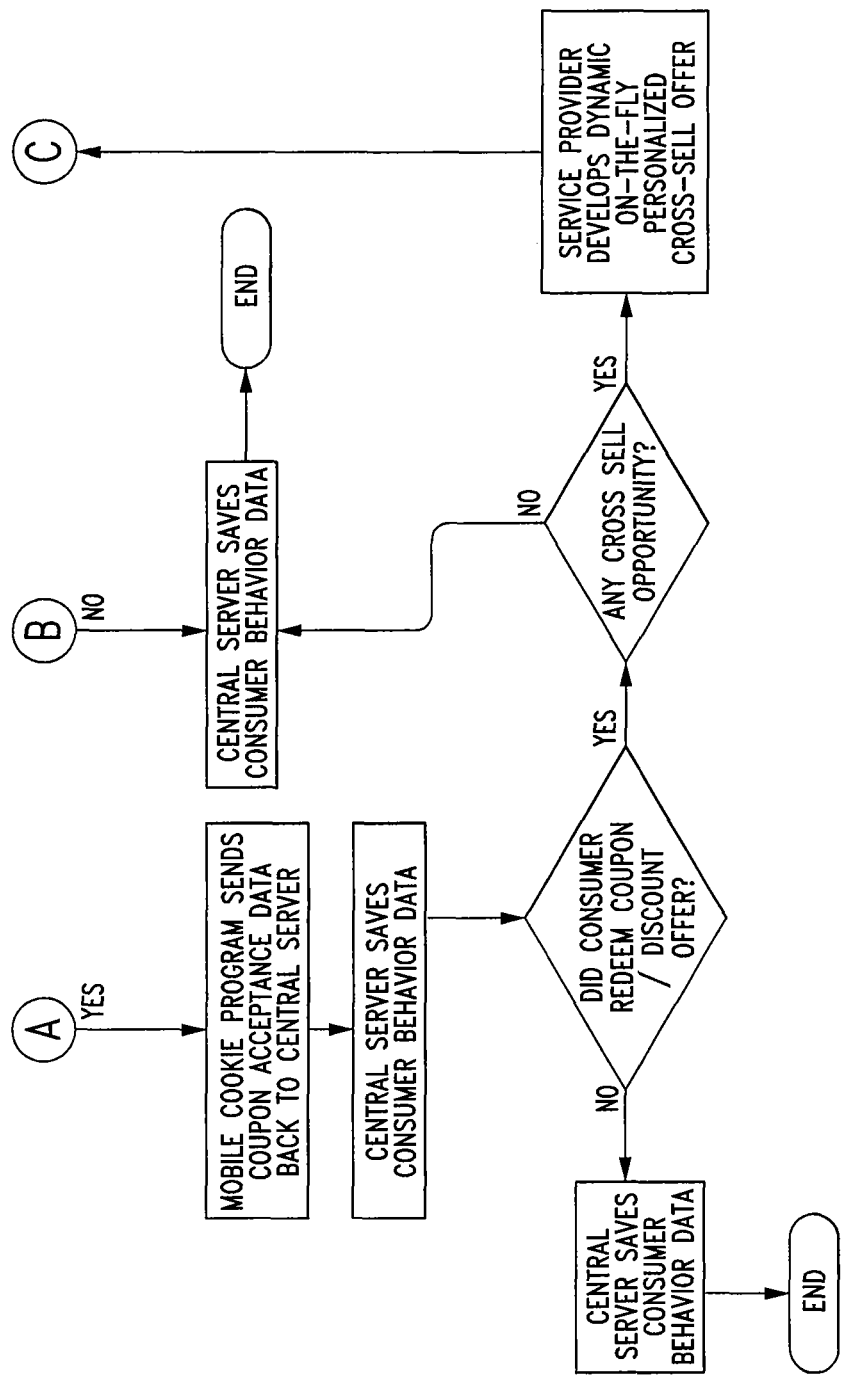
Figure 8:
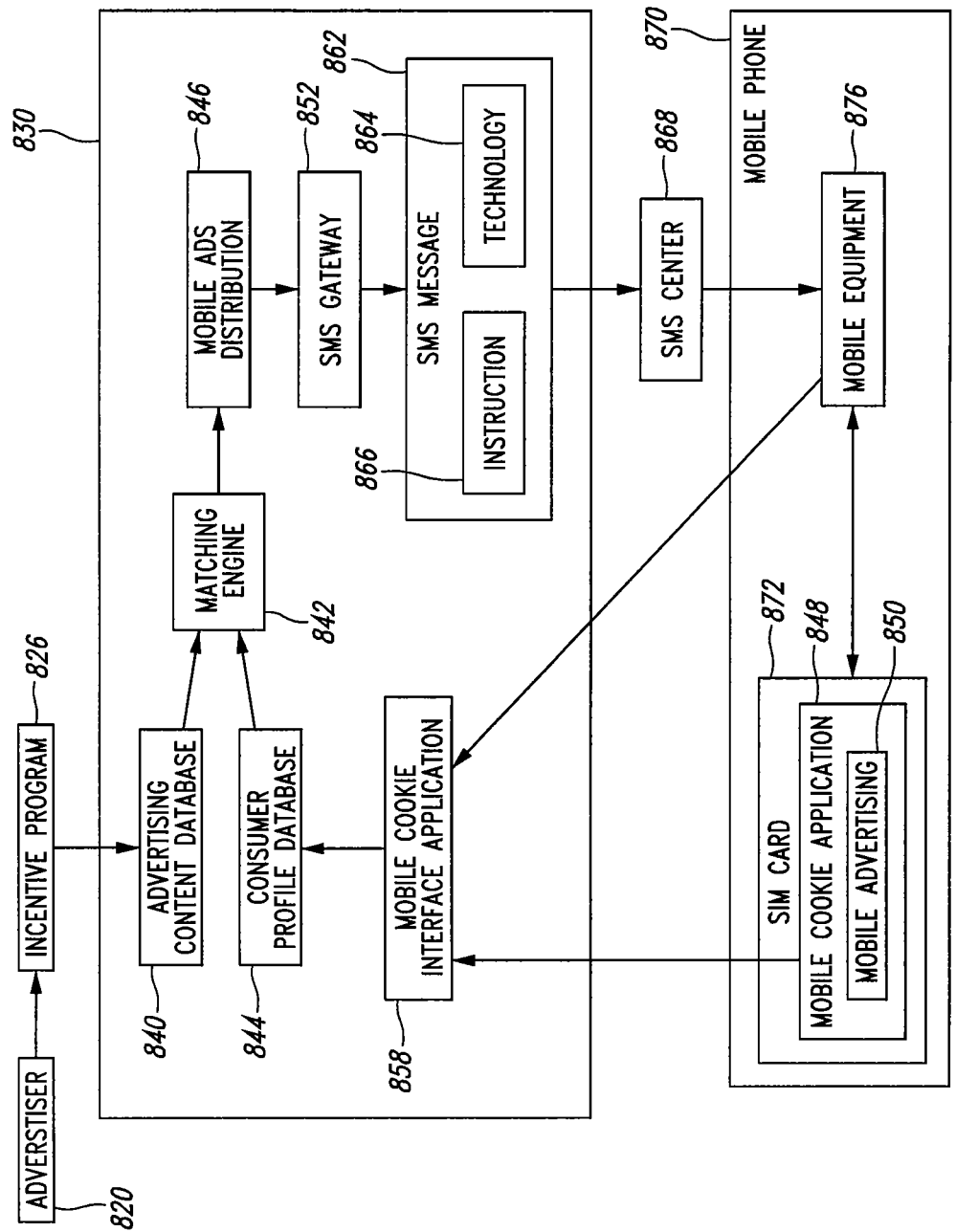

FIG. 1 is a schematic diagram of a marketing system.
FIG. 2 is a schematic diagram of a coupon redemption system.
FIG. 3 is a flow chart for a method of campaign creation.
FIG. 4 is a flow chart for a method of inter-enterprise marketing.
FIG. 5 is a flow chart for a method regarding a universal identification tag.
FIGS. 6A and 6B together depict a flow chart for a method for consumer behavior data collection.
FIG. 7 is a schematic of a ticket purchasing system.
FIG. 8 is a schematic of a mobile cookie application.

DETAILED DESCRIPTION OF THE INVENTION

Consumer purchasing behavior profiling system is presented in which consumer profiles are formed and updated based on a variety of data points, including demographic data, psychographic data, life style affinity, brand affinity, product preferences, real-time responses to advertising messages, past purchases, use of coupon and discount offers, price sensitivity, and market trends. Purchase records, use of coupon and discount offers, and the process by which the consumer goes through to select the coupons are collected and transmitted in near real-time to the consumer profiling system. These data are used to further analyze the consumer purchasing decision process. The consumer profiling system can be accessed by advertisers who wish to send targeted advertising messages to the consumers. Advertising information together with incentive level and mix are correlated with the consumer profile to produce a measure of the applicability of the ad to that consumer and the probability of converting that consumer. The advantage of the system lies in its ability to determine the mix of ad information, incentive level and type, and product offering that will be required to convert an ad viewer to a buyer. The system can be used to increase the effectiveness and cost efficiency of marketing campaigns. The system focuses on using wireless devices as the main communication media with the consumer. The system further resides in a method of using electronic coupons distribution and redemption to collect additional data points necessary to understand the consumer's purchasing decision process and factors that influence the purchasing decision.

Recent advancement of wireless devices such as mobile phones has opened up another channel for advertisers to communicate one-to-one with consumers. Due to the natural personal use of wireless devices, advertising messages on wireless devices can be fine tuned so that they are relevant, personalized, and anticipated to the individual consumers.

It would be advantageous to consumers, retailers, and manufacturers to use the wireless coupon distribution and redemption system. The system can reduce or eliminate the printing of paper coupons, the accounting for the coupons, the handling of the coupons, the waste associated with less than three percent of all distributed coupons being used, and coupon fraud. The consumers receive convenience of always-available targeted coupons, financial savings, and transaction efficiency. For advertisers and manufacturers, it can provide greater understanding of consumer purchasing behavior and more flexible marketing capability. Manufacturers and advertisers don't have to wait for months to receive coupon redemption data. The wireless coupon distribution and redemption can cut down the coupon distribution cycle from four weeks down to as little as one day and coupon redemption clearing cycle from eight weeks down to as little as two days. This allows the manufacturers to launch more incentive programs with shorter coupon life and marketing campaign cycle, allowing much more flexible marketing campaign. The system also allows manufacturers to make immediate adjustment to promotion programs currently underway in order to achieve the desired marketing effect. The main benefit to retailers and grocery chains is the reduction in time to collect money from manufacturers for the value of the redeemed coupons.

As described in FIG. 1, Consumer Goods & Services companies 110 can include manufacturers of consumer goods, hospitality service provider, artist, advertisers, event promoters, venue sponsors, and other consumer service providers. Retailers 105 can include grocery stores, venue owners, stadium, theater, retail stores, and event venues.

Retailers 125 can include grocery stores, venue owners, stadium, theater, retail stores, and event venues. The difference between retailers 105 and retailers 125 is that retailers 105 include those who participate in inter-enterprise marketing program with Consumer Goods & Services companies 110. Retailers 125 do not participate in inter-enterprise marketing program with Consumer Goods & Services companies 110.

Discount & incentive programs 120 refer to marketing and incentive programs offered by a single Consumer Goods & Services company 110. Discount & incentive programs 130 refer to joint marketing and incentive programs offered by several Consumer Goods & Services companies 110. Discount & incentive programs 140 refer to joint marketing and incentive programs offered by one or more Consumer Goods & Services company 110 and one or more retailer 105.

Membership Service Provider 200 refers to the entity providing service of distributing electronic coupons, discount offers, advertising messages, and ticket information to consumers and clearing transactions including coupon redemption clearing and ticket purchase fulfillment. Full description of membership service provider 200 will be apparent when reading the body of this document. Consumers 160 can include people who own or have access to wireless communication device like mobile phone or personal digital assistant.

Agents and clearinghouses 170 of Consumer Goods and Services companies 110 refers to an organization that process coupon clearing for the Consumer Goods & Services companies 110. The agents and clearinghouses 170 can be either independent coupon clearinghouses or departments within the Consumer Goods and Services companies 110.

At a high level, the process works as follows:
Step 1, consumers 160 submit personal profile data.
Step 2, Consumer Goods & Services (CG&S) companies 110 creates incentive programs 130. Consumer Goods and Services companies 110 can also team up with other Consumer Goods and Services companies 110 and/or retailers 105 to create inter-enterprise joint marketing programs 140.
Step 3, Consumer Goods and Services companies 110 and/or retailers 105 tap into membership service provider's Consumer Purchasing Behavior Profiling system 202 to determine the potential conversion rate for that particular incentive program.
Step 4, membership service provider's Consumer Purchasing Behavior Profiling system 202 provides preliminary data on potential effectiveness of marketing program back to Consumer Goods and Services companies 110 and/or retailers 105.

Step 5, Consumer Goods and Services companies 110 and/or retailers 105 adjust incentives as necessary to achieve target conversion rate.

Step 6, Consumer Goods and Services companies 110 and/or retailers 105 repeat step 3.

Step 7, Consumer Goods and Services companies 110 and/or retailers 105 submit final revised incentive program and marketing campaign to membership service provider's Consumer Purchasing Behavior Profiling system 202.

Step 8, membership service provider's Consumer Purchasing Behavior Profiling system 202 sends notification of private sales and discount offers to consumers 160.

Step 9, consumers 160 can optionally "clip" the electronic coupons and send the "selected" coupon to the membership service provider 200.

Step 10, membership service provider's Consumer Purchasing Behavior Profiling system 202 sends discount offer data (previously sent to the consumers) to retailers 125.

Step 11, consumers buy products at retail store and redeem electronic coupons.

Step 12, retailers 125 send coupon redemption data to membership service provider's Consumer Purchasing Behavior Profiling system 202.

Step 13, membership service provider's Consumer Purchasing Behavior Profiling system 202 updates its consumer purchasing behavior database system with real-time purchasing event data.

Step 14, membership service provider's Consumer Purchasing Behavior Profiling system 202 sends data on coupon redemption activities and effectiveness of marketing program to Consumer Goods and Services companies 110 and/or retailers 105.

Step 15, retailers can optionally 125 send coupon redemption data to agents and clearinghouses 170 of Consumer Goods and Services companies 110. In some cases, the clearinghouses are independent coupon clearinghouses. In other cases, the clearinghouses are departments within the Consumer Goods and Services companies.

Step 16, agents and clearinghouses 170 of Consumer Goods and Services companies verify coupon redemption and reimburse retailers.

Step 17, in situations where agents and clearinghouses of Consumer Goods and Services companies are independent coupon clearinghouses, the agents and clearinghouses 170 will send invoices to Consumer Goods and Services companies 110 and/or retailers 105.

Step 18, retailers 125 and membership service provider 200 will receive payment for the value of the redeemed coupon and coupon redemption services, respectively. In the situation where agents and clearinghouses 170 of Consumer Goods and Services companies are independent clearinghouses, the agents and clearinghouses 170 are responsible for collecting the money from Consumer Goods and Services and paying the retailers 125 and membership service provider 200. In other situations, the Consumer Goods and Service companies 110 pay the retailers 125 and membership service provider 200 directly.

First Implementation

The present invention focuses on using coupon redemption to build a Consumer Purchasing Behavior Profiling system.

As described in FIGS. 2 and 5, the process begins with the consumers 255 who join a paperless product discount membership and are provided with an individualized membership identification (ID) tag 550. The consumers 255 can include people who own or user of wireless communication device, like mobile phone, personal digital assistant, wireless-communication enabled computers, and pager. As described in FIG. 5, the membership tags can include a uniquely identifiable code and/or a memory storage mechanism, like Radio Frequency Identification (RFID) or micropayment devices or barcode or other means known by those versed in the current art, which contains the consumer's membership information. The tag can have adhesive material on one side such that it can be "taped" onto a credit-card size plastic card or on the back of a wireless communication device like the mobile phone. The membership tag can also be in an electronic format like an electronic image of a barcode that can be displayed on a wireless device like mobile phone or Personal Digital Assistant (PDA).

As described in FIG. 2, the consumers 255 provide personal profile data as a condition of joining the membership. The profile can include demographic data, psychographic data, life style affinity, brand affinity, and product preferences. Demographic data can include address, age, gender, income, household information, number of cars, housing information, etc. Psychographic data include hobbies, areas of interest, etc. Life style affinity can include leisure activities, entertainment preferences, etc. Brand affinity can include names of products and/or manufacturers that the consumers want to receive advertising messages from. Product affinity can include types of product the consumers had purchased in the past, are considering buying, or want to learn more about. Consumers can provide these data via internet, fax, interactive voice response (IVR), web-enabled wireless communication devices like mobile phones or PDA, or other communication means by those well versed in the art.

It should be noted that herein the term "profiles", is used to indicate a database of all data stored in the consumer purchasing behavior database. Further, for convenience, reference is made to grocery stores, however any type of retail or wholesale store or service or sporting venue can take advantage of the system. Also for convenience, references are made to manufacturers, however any type of consumer goods and services companies and/or advertisers can take advantage of the system. Additionally, for convenience, reference is made to mobile phones, however any type of wireless communication device like wireless-communication enabled computers, personal digital assistant (PDA), pager, or Black Berry text pager can be used to receive electronic coupons. The membership provider's centralized computer can have the following components: Advertising Content database 225, Consumer Profile database 220, Consumer Purchasing Behavior Analytic system 202, data warehouse, matching engine 215, mobile application suite 232, and Mobile Cookie application 230.

The Advertising Content database 225 can store data including the following: product information, price, discount level, type of discount, start date, expiration date, target consumer, dynamic pricing instruction, probabilistic conversion rate, maximum number of use, personalized advertising message, personalized content/image, and participating retail stores. An example of dynamic pricing can include "give consumer an additional $50 off the item if consumer views the ad but does not select the coupon".

The Consumer Profile database 220 can store data including the following: demographic, psychographic, brand affinity, product affinity, life style affinity, purchasing decision process, purchased products (including brand, size, frequency, type), coupon used (discount level, product information, date of use), and historical responses to targeted ads.

Consumer Purchasing Behavior Analytic system 202 can include of 1) an adaptive neural networks engine 205 to analyze the consumer purchasing behavior and purchasing decision making process and 2) an experts system 210 to calculate the probabilistic conversion rate of the specific incentive program. The adaptive neural networks engine 205 can implement an industry well-known feed-forward-back-propagation model or similar model well-known by those versed in the current art. The experts system 210 can implement industry well-known techniques of "Reasoning Under Uncertainty" or similar model well-known by those versed in the current art.

The matching engine 215 can use a heuristic matching technique to match the consumer profiles to the consumer profile filtering conditions specified in the incentive program provided by the manufacturers (or advertisers) 270. This matching engine 215 can be used by the manufacturers (or advertisers) 270 to select the consumer group 255 who can receive the coupons. An example of profile filtering condition can include "provide this discount offer to consumers whose ages are between 18-25, income range from $30,000-$50,000, have two cars, own a house, and buy Campbell soup at least once a month".

The Mobile Cookie application 230 (see the third embodiment) can be a small program that can be deployed onto the mobile phones. The Mobile Cookie application is designed to collect the consumers' responses to targeted ads and send this data back to the membership service provider for profiling purposes. The Mobile Cookie can be a program deployed in the Subscriber Identity Module (SIM) card of Global System for Mobile communications (GSM) phones or a small program on the Wideband Code Division Multiple Access (WCDMA) chip or a small subroutine that is embedded in the interactive mobile coupon application sent to the consumers' wireless communication device. The mobile application suite 232 can include Mobile Coupon Distribution application 235, Mobile Coupon Search application 245, and Mobile Coupon Redemption applications 240.

As described in FIGS. 1, 2 and 3, the manufacturers (or advertisers) 270 can periodically upload the service provider's Advertising Content database 225 with current product discounts. The manufacturers (or advertisers) can create marketing campaigns, advertising programs, and incentive programs 120. For each incentive program 120, the manufacturers (or advertisers) will provide incentive program data including the following: product information, price, discount level, type of discount, start date, expiration date, target consumer profile filtering conditions, dynamic pricing instruction, maximum number of use, personalized advertising message, personalized content/image, and participating retail stores.

The manufacturers (or advertisers) can use the service provider's experts system 210 in the Consumer Purchasing Behavior Analytic system 202 to calculate the probabilistic conversion rate for this particular incentive program (Step 350). The manufacturers (or advertisers) can, through an iterative process, make changes (Step 360) to the incentive program 120 and re-calculate the probabilistic conversion rate until a desired conversion rate has been achieved. The manufacturers (or advertisers) 270 submit (Step 370) the incentive program 120 and make the incentive program 120 available to the target consumers who fit the profile filtering conditions.

As described in FIG. 1, while the discussion thus far focuses on the manufacturers 110 creating their own incentives 120, in some instances manufacturers 110 and/or retailers 105 may wish to bundle their products and create a cross-brand bundled discount offer under an inter-enterprise collaborative marketing campaign 130 and 140, respectively. An example of this is "buy 5 cans of Campbell soup and get $1 off 24-pack Coca-Cola". As described in FIG. 1, in these situations, the manufacturer 110 or retailer 105 who initiated the joint marketing campaign sends a request to the membership service provider 200 for a joint marketing administrative account. As described in FIGS. 2 and 4, the membership service provider will create (Step 410) a joint marketing administrative account and send the log-in information to the initiating manufacturer or retailer. The user (Step 420) of the joint marketing administrative account will create several inter-enterprise collaborative marketing accounts and send (Step 430) electronic invitations to his/her business partners to join/participate in the joint marketing campaign. The electronic invitation can be email, pager, America-On-Line (AOL) instant messaging, Short Message Service (SMS) message, or other means known by those well versed in the art. The electronic invitation will include, at the minimum, the log-in username and password for the joint marketing campaign account and a brief description and nature of the marketing campaign.

The business partners (Step 440) who wish to participate in the joint marketing campaign will log-in to the membership service provider's system (using the previously provided log-in account) and enter (Step 450) their discount offers and the terms and conditions for these discounts. The terms and conditions include, but not limited to, which consumer groups can receive the discount and the maximum number of use. The administrative account user (Step 420) will pull all discount offers and create incentive programs that combine discount offers from various business partners (Step 440). The initiating manufacturer or retailer (Step 440) of the joint marketing campaign will upload the service provider's Advertising Content database 225 with the combined product discounts (Step 480). For each joint incentive program, the initiating manufacturer or retailer (Step 420) will provide incentive program data including the following: product information, price, discount level, type of discount, start date, expiration date, target consumer profile filtering conditions, dynamic pricing instruction, maximum number of use, personalized advertising message, personalized content/image, and participating retail stores.

The initiating manufacturer or retailer (Step 420) can use the service provider's experts system 210 in the Consumer Purchasing Behavior Analytic system 202 to calculate (Step 482) the probabilistic conversion rate for this particular joint incentive program 130 and 140. The initiating manufacturer or retailer (Step 420) can, through an iterative process, make changes to the joint incentive program 130 and 140 and re-calculate (Step 486) the probabilistic conversion rate until a desired conversion rate has been achieved. The initiating manufacturer or retailer (Step 420) submits (Step 490) the joint incentive program 130 and 140 and makes the joint incentive program 130 and 140 available to the target consumers.

As described in FIG. 2, periodically, like every few hours, the service provider's Mobile Coupon Distribution application 235 retrieves the incentive programs stored in the Advertiser Content database 225 and launches the matching engine 215 to get a list of consumer 255 who fit the filtering conditions. The Mobile Coupon Distribution application 235 takes the generic advertising message, coupon data, and consumer profile and dynamically constructs personalized advertising messages, one for each target consumer 255 who will receive the coupon. The Mobile Coupon Distribution application 235 sends the ads to the wireless communication devices 250 of consumers 255 who fit the filtering conditions specified in the incentive program.

Upon receiving the electronic coupons on the wireless communication device, like mobile phone or PDA, 250, the consumers 255 can "clip" the coupons that he/she is interested in. "Clip" consists of using the button on the wireless communication device to highlight the electronic coupon and clicking on the appropriate button to select "ACCEPT COUPON" option. An optional Mobile Cookie application 230, that resides on the mobile phone, can observe how the consumers respond to the ad and sends this data back to the membership provider's system.

Data sent back to the membership provider's system can include the order that the coupons are "clipped", the timing between "clips", and whether the consumer had reviewed the details of the coupon/discount offer. The Mobile Cookie application 230 can also send the "clipped" coupons back to the membership service provider's Consumer Profile Database 220. The consumer can also initiate the coupon retrieval by launching the Mobile Coupon Search application 245 from the wireless communication device, like mobile phone or PDA, 250. This is usually performed when the consumer wants to search for coupons of products that are not specified in his/her profile.

Once the membership service provider's Consumer Profile Database 220 has received the "clipped" electronic coupons that were sent by the Mobile Cookie application 230 from the consumers' wireless communication devices, like mobile phones or PDA, 250, the service provider's Mobile Coupon Distribution application 235 sends the coupon information along with the consumers' membership identification code to the local coupon database servers 265 located at the participating retailers and grocery stores 264. The Mobile Coupon Distribution application 235 may also send the acknowledgement message to the consumers 255 at their wireless communication device, like mobile phone or PDA, 250 to let them know that the electronic coupons can now be redeemed at the participating stores or retailers 264.

As described in FIGS. 2 and 5, to redeem the electronic coupons, the consumer 255 collects the items to be purchased and brings them to the checkout counter. At the checkout counter or other Point of Sale (POS) 260, the clerk enters the purchase information of the products into the cash register by either scanning the Universal Product Code (UPC) bar code or using other current entry methods. Since cash registers or POS 260 are in effect computer terminals for the entry of data into the computers where local coupon database 265 of the participating retailers and grocery chains 264 reside, an application can be incorporated into existing Point of Sale (POS) systems to read the membership identification code on the consumer membership identification tag 550. As described in FIG. 5, after all of the purchases have been recorded into the cash register, the clerk scans the memory storage on the consumer's membership identification tag 550. The entry of the data on the consumer's membership identification tag 550 activates the up-linking with the retailer or grocery chain's local coupon database server 265, whereupon the validity of the consumer's membership is confirmed.

The computerized cash register or POS 260 can batch load the bar codes of all products being purchased to the local coupon database system 265. The local coupon database system 265 then cross checks the purchased products and consumer's membership identification code 550 against the local coupon database system 265 containing manufacturer's discounts, comparing item sizes, brands, and the like, ascertaining the availability of a product discount. For those products that are subject to a discount, the local coupon database system 265 itemizes the discounts, totals the discounts and transfers the sum back to the computerized cash register or POS 260.

Optionally, the local coupon database system 265 can advise the consumer 255, by printing on their receipt, comparable brands that would have qualified for a discount. The local coupon database system 265 can also advise the cashier that the customer has chosen a wrong size product to qualify for the discount, thereby allowing for the correction to be made. The discount total is deducted from the total bill to the consumer 255. The consumer 255 then pays the total purchase price of the goods, less the discount provided by the system.

As transactions are completed, the local coupon database system 265 takes the identification codes of the purchased products and, linking the product identification codes to consumer identification codes 550, accumulates in the database the listing of all products, which that particular member has purchased. The system also records the time and date of purchases and thus builds a detailed database of member purchase information. The local coupon database system 265 sends this information to the membership service provider's Mobile Coupon Redemption Application 240.

Upon receiving the coupon redemption data from the retailers and grocery chains 264, the membership service provider's Mobile Coupon Redemption application 240 saves this information in the Consumer Profile Database 220 and sends the coupon redemption reports to advertisers and manufacturers 270 who provided the incentive programs. The Mobile Coupon Redemption application 240 can also cross-check for any cross-sell or up-sell opportunity and alerts the consumers of the special discount offers. Upon receiving the coupon redemption data from the membership service provider 200, advertisers and manufacturers 270 promptly pay the retailers 264 for the value of the redeemed coupons and pay the membership service provider 200 for the services associated with distributing and clearing redeemed coupons.

Periodically, like once a day, the service provider's Consumer Purchasing Behavior Analytic system 202 can launch the adaptive neural networks application 205, which retrieves recent purchasing data from the Consumer Profile database 220 and Advertising Content database 225 and uses them as data points for its training, testing, and validating data sets. The adaptive neural networks application 205 uses the collected data to analyze the consumer purchasing behavior and purchasing decision process. The results will be stored in the Consumer Profile database 220.

Today's neural networks systems that are designed to analyze consumer purchasing behavior don't have the self-enhancing capability. When these systems are initially set up, they receive training, testing, and validating data sets that are reflective of their current environment. Their recommendations, at that time, are fairly accurate. As time goes by, the consumers' tastes, preferences, life styles, and purchasing behaviors change. The data sets in these neural networks become stale and the recommendations provided by these systems become less accurate. Due to high cost of setting up and obtaining new data sets for these systems, these systems are often not replaced. Advertisers who continue to use these systems often design marketing campaigns that are, for the most part, completely ineffective.

The current invention on wireless coupon distribution and redemption system collects volume of consumer purchasing behavior data on a daily basis and, therefore, can provide the neural networks system with fresh data sets, allowing the neural networks system to keep up with changing market conditions and trends. This gives the system unparalleled ability to provide accurate recommendation on marketing campaigns, which cannot be accomplished with prior art systems.

Another key differentiator of this system over prior art systems is the amount and level of detail of the profile data being collected. Today's advertising campaigns use the fire-and-forget model. Advertisers don't have a way to accurately track what happen to their ads. Advertisers don't have the ability to observe what the consumers did with their ads. They cannot tell whether the consumers throw the ad away upon receiving it, open the ad and read the advertising message before throwing the ad away, or open the ad and read the advertising message and then save the ad.

The current invention can accurately track what the consumers did with the ad. The current invention combines the Mobile Coupon Distribution 235, Mobile Coupon Redemption 240, and Mobile Cookie applications 230 to provide a 360 degree view of the consumers' purchasing decision process. The Mobile Coupon Distribution application 235 can track which coupons were sent to the consumers' wireless communication devices, like mobile phones or PDA, 250, the advertising message, and the discount level. The Mobile Cookie application 230 can observe which coupons were "clipped", which coupons were rejected, and the process and order of which the coupons are "clipped" and the timing between "clippings". The Mobile Coupon Redemption application 240 can track which "clipped" coupons were eventually redeemed. Together, these three applications provide deep insight into the consumers' purchasing decision process that is not achievable with prior art systems.

The information in the Consumer Profile database 220 can also be used to generate reports to participating advertisers and manufacturers 270 and retailers 264, showing consumer profiles and local buying trends. By knowing where certain products are being sold and who is buying these products, advertisers and manufacturers 270 have information as to who is buying their products and in what areas of the country certain products sell. Advertising costs can then be directed to either increase consumer awareness of a product or maintain the current rise of sales within a specific area. The available data also facilitates targeted mailing, thus eliminating the incredible amount of guess work which is associated with typical coupon mailings. The merchant or manufacturer can thus initiate a "customer loyalty" program that can reward a consumer based on that specific consumer's buying habits. The cost savings can produce higher profits and decreased consumer prices.

The data collected can also have significant value in enabling a grocery store (or other retailer) 264 and/or advertiser and manufacturer 270 to determine buying patterns, thereby increasing the accuracy of inventory stocking and delivery schedules. The profiling information collected on the consumer purchasing behavior is more specific than that which can be obtained by prior art systems.

The accumulated consumer profile data, such as the specific number of times a given class product was purchased, or the specific number of times a given product within a class of products was purchased, can periodically be downloaded. The flexibility of the database gives the retailers 264 and/or advertisers and manufacturers 270 the ability to provide retrieve customized reports. Thus, the reports can provide information which is pertinent, based on the immediate requirements of the customer. This allows manufacturers to track the introduction of a new product, by area, in response to discounts, rebates, etc., while still maintaining standard surveillance over established products.

In the case of merchants or other retailers 264 who do not have the fully computerized cash registers, currently characteristic of small merchants, the system can be restricted to connection by a VeriFone or micropayment device or similar connection system. The connection system would allow for the non-computerized merchant to connect to the membership provider's centralized computer consumer profile database 220 to verify a member's eligibility.

Additionally, if applicable, there can be a determination of whether pre-set buying discount limits, or other restrictions have been reached. The membership provider's computer will then verify or approve the transaction to the merchant. Once a customer's eligibility has been determined, the merchant enters the items into the communication system for totaling and entry into the database. The total deduction would then be deducted from the consumer's total prior to payment. The data transferred from the general merchants can include all product information or can be limited to the amount of the transaction or other selected information.

The advantage of using the wireless coupon distribution and redemption system is obvious. The system eliminates the printing of paper coupons, the accounting for the coupons, the handling of the coupons, the waste associated with less than three percent of all distributed coupons being used, and coupon fraud. The consumers receive convenience of always-available targeted coupons, financial savings, and transaction efficiency. For manufacturers (or advertisers) 270, it provides greater understanding of consumer purchasing behavior and more flexible marketing capability.

Manufacturers (or advertisers) don't have to wait for months to receive coupon redemption data. The wireless coupon distribution and redemption can cut down the coupon distribution cycle from four weeks down to one day and coupon redemption clearing cycle from eight weeks down to two days. This allows the manufacturers to launch more incentive programs with shorter coupon life and marketing campaign cycle, allowing much more flexible marketing campaign. The membership service provider system 200 also allows manufacturers to make immediate adjustment to promotion programs currently underway in order to achieve the desired marketing effect. The main benefit to grocery chains and other retailers 264 is the reduction in time to collect money from manufacturers for the value of the redeemed coupons.

Second Implementation

The second embodiment of the present invention focuses on using ticket purchasing to build a Consumer Entertainment Preference Profiling system. As described in FIGS. 5 and 7, the process begins with the consumers 755 who join a paperless product discount membership and are provided with an individualized membership identification tag 550. The consumers 255 can include people who own or user of wireless communication device, like mobile phone, personal digital assistant, and pager. As described in FIG. 5, the membership identification tags 550 include a uniquely identifiable code and/or a memory storage mechanism, like a Radio Frequency Identification (RFID) or micropayment ID tag or barcode or other means known by those versed in the current art, which contains the consumer's membership information. The tag can have adhesive material on one side such that it can be "taped" onto a credit-card size plastic card or on the back of a wireless communication device like the mobile phone. The membership tag can also be in an electronic format like an electronic image of a barcode that can be displayed on a wireless device.

The consumers 755 provide personal profile data as a condition of joining the membership. The profile can include demographic data, psychographic data, life style affinity, artist affinity, team affinity, and entertainment category preference. Demographic data can include address, age, gender, income, household information, number of cars, housing information, etc. Psychographic data can include hobbies, areas of interest, etc. Life style affinity can include leisure activities, entertainment preferences, etc. Team affinity can include the name of sports teams consumers want to receive advertising messages from. Artist affinity can include types of music the consumers had purchased in the past, are considering buying, or want to learn more about. Consumer can provide these data via internet, fax, Interactive Voice Response (IVR) system, web-enabled wireless communication devices like mobile phones and personal digital assistant, or other communication means by those well versed in the art.

It should be noted that herein the term "profiles", is used to indicate a database of all data stored in the consumer purchasing behavior database. Further, for convenience, reference is made to sporting venues, however any type of retail or wholesale store or service or entertainment venue can take advantage of the system. Additionally, reference is made to venue sponsors, however any ticketing company or ticket distribution broker or ticket distribution company or event promoter or advertisers can take advantage of the system. Also, for convenience, reference is made to mobile phones, however any type of wireless communication device like Personal Digital Assistant (PDA), pager, or Black Berry text pager can be used to receive electronic messages.

As described in FIG. 7, the membership provider's computer system 700 can have the following components: Advertising Content database 725, Consumer Profile database 720, Consumer Purchasing Behavior Analytic system 702, data warehouse, matching engine 715, mobile application suite 732, and Mobile Cookie application 730.

The Advertising Content database 725 can store data including the following: ticket and show information, price, discount level, type of discount, show times, target consumer, dynamic pricing instruction, probabilistic conversion rate, maximum number of use, personalized advertising message, personalized content/image, and participating venues. An example of dynamic pricing can include "give consumer an additional $10 off the ticket price if consumer views the ad but does not purchase the ticket".

The Consumer Profile database 720 can store data including the following: demographic, psychographic, artist affinity, team affinity, life style affinity, purchasing decision process, purchased products (including music, movie, and ticket to sporting event and other entertainment events), discount offers used (discount level, show information, date of use), and historical responses to targeted ads.

Consumer Purchasing Behavior Analytic system 702 can include of 1) an adaptive neural networks engine 705 to analyze the consumer purchasing behavior and purchasing decision making process and 2) an experts system 710 to calculate the probabilistic conversion rate of the specific incentive program. The adaptive neural networks engine 705 can implement an industry well-known feed-forward-back-propagation model or similar model well-known by those versed in the current art. The experts system 710 can implement industry well-known techniques of "Reasoning Under Uncertainty" or similar model well-known by those versed in the current art.

The matching engine 715 can use a heuristic matching technique to match the consumer profiles to the consumer profile filtering conditions specified in the incentive program provided by the venue sponsors (or event promoters or advertisers) 764. This matching engine 715 is used by the venue sponsors (or event promoters or advertisers) 764 to select the consumer group 755 who can receive the discounts. An example of profile filtering condition can include "provide this discount offer to consumers whose ages are between 18-25, income range from $29,000-$50,000, have two cars, own a house, and bought two tickets to the game in the last two months".

The Mobile Cookie application 730 (see the third embodiment) can be a small program that can be deployed onto the mobile phones. The Mobile Cookie application is designed to collect the consumers' responses to targeted ads and send this data back to the membership service provider for profiling purposes. The Mobile Cookie 730 can be a program deployed in the Subscriber Identity Module (SIM) card of Global System for Mobile communications (GSM) phones or a small program on a Wideband Code Division Multiple Access (WCDMA) chip or a small subroutine that is embedded in the interactive mobile coupon application sent to the consumers' wireless communication device, like mobile phone or PDA.

The mobile application suite 732 includes Mobile Ticket Distribution application 735, Mobile Ticket Search application 745, and Mobile Ticket Purchasing 740 applications. Mobile Ticket Purchasing is a program that is generated dynamically based on a variety of inputs including discount offers and dynamic pricing rules.

As described in FIGS. 7 and 3, the venue sponsors (or event promoters or advertisers) usually "deposit" the electronic tickets in advance at the Ticket Distributor's system 780. Prior to the event, the venue sponsors (or event promoters or advertisers) 764 will upload the service provider's Advertising Content database 725 with current discounts on tickets. For each incentive program 120, the venue sponsors (or event promoters or advertisers) 764 can provide incentive program data including the following: show information, available seat, seating price, discount level, type of discount, show time, target consumer profile filtering conditions, dynamic pricing instruction, maximum number of use, personalized advertising message, personalized content/image, and participating venues.

The venue sponsors (or event promoters or advertisers) 764 can use the service provider's experts system 710 in the Consumer Purchasing Behavior Analytic system 702 to calculate the probabilistic conversion rate for this particular incentive program (Step 350). The venue sponsors (or event promoters or advertisers) can, through an iterative process, make changes (Step 360) to the incentive program and re-calculate the probabilistic conversion rate until a desired conversion rate has been achieved. The venue sponsors (or event promoters or advertisers) 764 submit (Step 370) the incentive program 120 and make the incentive program 120 available to the target consumers.

As described in FIGS. 1, 4 and 7, while the discussion thus far focuses on the venue sponsors or other consumer goods and services companies 110 creating their own incentives, in some instances manufacturers of the consumer goods and services 110, retailers, hospitality service providers, venue sponsors (or event promoters or advertisers) of entertainment events 105 and/or entertainment content providers 105 may wish to bundle their products and create a cross-brand bundled discount offer under an inter-enterprise collaborative marketing campaign 130 and 140. An example of this can be "buy Blue Man Group ticket at 10% off and receive 5 free ring tones and 2 screen saver images" or "stay at Hyatt hotel on Saturday and receive 10% off ticket price to Lion King show". For ease of reference, the current invention will refer the manufacturer, retailer, hospitality service provider, venue sponsor, or entertainment content provider who initiated the joint marketing campaign as the Initiator. In these situations, the Initiator (Step 420) sends a request to the membership service provider 200 for a joint marketing administrative account.

The membership service provider 200 will create (Step 410) a joint marketing administrative account and send the log-in information to the Initiator. The user (Step 420) of the joint marketing administrative account will create several inter-enterprise collaborative marketing accounts and send (Step 430) electronic invitations to his/her business partners to join/participate in the joint marketing campaign. The electronic invitation can be email, pager, America-On-Line (AOL) instant messaging, Short Message Service (SMS) message, or other means known by those well versed in the art. The electronic invitation will include, at a minimum, the log-in account and password for the joint marketing campaign account and a brief description and nature of the marketing campaign. The business partners (Step 440) who wish to participate in the joint marketing campaign will log-in to the membership service provider's system (using the previously provided log-in account) and enter (Step 450) their discount offers and the terms and conditions for these discounts.

The terms and conditions can include, but not limited to, which consumer groups can receive the discount and the maximum number of use. The Initiator (Step 420) will pull all discount offers and create incentive programs that combine discount offers from various business partners (Step 440). The Initiator (Step 420) will upload the service provider's Advertising Content database 725 with the combined product discounts (Step 480). For each joint incentive program 130 and 140, the Initiator (Step 420) will provide the following data: product information, price, discount level, type of discount, start date, expiration date, target consumer profile filtering conditions, dynamic pricing instruction, maximum number of use, personalized advertising message, personalized content/image, and participating retail stores.

The Initiator (Step 420) can use the service provider's experts system 710 in the Consumer Purchasing Behavior Analytic system 702 to calculate (Step 482) the probabilistic conversion rate for this particular joint incentive program 130 and 140. The Initiator (Step 420) can, through an iterative process, make changes to the joint incentive program 130 and 140 and re-calculate (Step 486) the probabilistic conversion rate until a desired conversion rate has been achieved. The Initiator (Step 420) submits (Step 490) the joint incentive program 130 and 140 and makes the joint incentive program 130 and 140 available to the target consumers who fit the profile filtering conditions.

As described in FIG. 7, periodically, like every few hours, the service provider's Mobile Ticket Distribution application 735 retrieves the incentive programs stored in the Advertiser Content database 725 and launches the matching engine 715 to get a list of consumer and/or consumer group 755 who fit the filtering conditions. The Mobile Ticket Distribution application 735 takes the generic advertising message, show data, and consumer profile and dynamically constructs personalized advertising messages, one for each target consumer 755 who will receive the discount. The Mobile Ticket Distribution application 735 can send the ads along with the Mobile Ticket Purchasing application 740 to the wireless communication device, like mobile phone or PDA, 750 of the consumers 755 who fit the filtering conditions specified in the incentive program.

Upon receiving the electronic ad and Mobile Ticket Purchasing application 740 on the wireless communication device 750, the consumers 755 can go through the Mobile Ticket Purchasing application and purchase the ticket. The Mobile Ticket Purchasing application 740 uses the dynamic pricing rules specified by the venue sponsor 764 to provide a progressive discount based upon how the consumer responded to the ad. The membership provider can optionally deploy a "Mobile Cookie" application on the mobile phone. The Mobile Cookie application 730, residing on the mobile phone 750, can observe how the consumers respond to the ad and can send this data back to the membership provider's consumer profile database system 720. Data sent back to the membership provider's consumer profile database system 720 can include which discount was selected and whether the consumer had reviewed the details of the show and discount offer. The Mobile Cookie can also send the ticket purchasing confirmation back to the membership service provider's system. Upon successful completion of ticket purchase, the Mobile Ticket Purchasing application 740 clears the tickets with the ticket distributors.

The Mobile Ticket Purchasing can be a full menu-driven application or one-way text-messaging application, based on the technological capability of the wireless device. In the case of a full menu-driven application, the consumers go through the application and interact directly with the automated system to purchase the ticket. In the case of one-way text-messaging application scenario, it is conceivable that the membership service provider sends a text message to the consumers' wireless devices with the show information, contact phone numbers, and/or instruction on how to purchase the ticket via text messaging. In this scenario, the consumers can purchase the ticket by either calling the ticketing agent directly at the phone number provided or requesting the ticketing agent to call the consumer by responding to the text message per the instruction provided in the advertising text message.

The consumer 755 can also initiate the discount and show/event search by launching the Mobile Ticket Search application 745 from the wireless device, like mobile phone or PDA, 750. This is usually performed when the consumer wants to search for shows that are not specified in his/her profile. The Mobile Ticket Search application can be either a full menu-driven application or one-way text-messaging application, based on the technological capability of the wireless device. In the case of a full menu-driven application, the consumers go through the application and interact directly with the automated system to purchase the ticket.

In the case of one-way text-messaging application scenario, it is conceivable that when the consumers initiate the ticket search request the membership service provider sends a text message to the consumers' wireless devices with the show information, contact phone numbers, and/or instruction on how to purchase the ticket via text messaging. In this scenario, the consumers can purchase the ticket by either calling the ticketing agent directly at the phone number provided or requesting the ticketing agent to call the consumer by responding to the text message per the instruction provided in the advertising text message.

Once the membership service provider's system 720 has received the ticket purchasing confirmation that was sent by the Mobile Cookie application 730 from the consumers' phones 750, the service provider's Mobile Ticket Distribution application 735 sends the ticket information along with the consumers' membership ID to the local ticketing database servers 765 located at the venues sponsor 764. It is conceivable that some venue sponsors will not deploy a local ticket database server and will use a remote server of a ticketing agency like Ticketmaster. The Mobile Ticket Distribution application 735 can optionally send the acknowledgement message to the consumers' wireless communication devices, like the mobile phone or PDA, 750 to let them know that the electronic ticket can now be redeemed at the participating venues sponsors 764.

The membership service provider's Mobile Ticket Distribution application 735 saves this information in the Consumer Profile database 720 and sends the ticket purchasing reports to ticket distributors (or event promoters or advertisers) 780. The Mobile Ticket Distribution application 735 can also cross-check for any cross-sell or up-sell opportunity and alerts the consumers 755 of the special discount offers. Note that the acknowledgement can be a simple text message or an electronic image of a barcode that can be read by an image barcode reader. The confirmation acknowledgement can be uniquely generated for every consumer in such a way that it cannot easily be duplicated. This approach will be implemented to prevent fraudulent ticket pick up at the will call booth or the gate.

Upon receiving the ticket purchasing data from the membership service provider's Mobile Ticket Distribution application 735, the venue sponsors 764 promptly pays the membership service provider for the services associated with selling the tickets.

To pick up the electronic ticket, the consumer 755 can go to the will call booth 768 and ask for a hard-printed ticket. This ticket will have a barcode, allowing for easy access at the gate. Alternatively, the consumer can go directly to the gate and use the membership identification tag and other consumer ID codes 550 and/or confirmation acknowledgement message (which consists of a simple text message/code or an electronic image of a barcode) and/or micropayment ID tag to authorize the release of the electronic ticket.

At the gate, an access control staff like a security personnel scans the bar code on the hard-printed ticket, scans the barcode and/or RFID on membership ID tag, or scans the electronic image of the barcode acknowledgement, or micropayment ID tag or punches in the confirmation acknowledgement code and/or other consumer identification codes 550. Since scanners 760 are in effect computer terminals for the entry of data into the computers local ticketing database 765 of the participating venues sponsors 764, an application can be incorporated into existing scanners 760 to read the membership ID on the consumer membership ID tag, the electronic acknowledgement code (both electronic barcode image or text confirmation code), barcode on the hard-printed ticket, or the consumer ID code 550.

The entry of the data on the consumer's membership ID tag or barcode on the hard-printed ticket or electronic acknowledgement (both electronic barcode image or text confirmation code) activates the up-linking with the venue sponsors' ticketing database server having the local ticketing database 765, whereupon the validity of the consumer's membership and/or ticket information is confirmed. Upon successful validation, the consumer is authorized to enter the venue.

Season ticket holders can also use this system to enter the event venues without bringing printed paper tickets. In this scenario, the ticket had already been purchased and the consumers just leverage the electronic ticket release system to pick up their tickets. To take advantage of this system, a strong authentication mechanism is required for this scenario. The authentication mechanism can be accomplished by either 1) sending a different image of a barcode to the consumers' wireless device for each event and having the image scanner, located at the event venue, read the barcode image. Under this approach, the barcode is specific to that event and a different barcode will be sent to the wireless device for the next event; 2) sending a different text confirmation code to the consumers' wireless device for each event and having the agents at the gate enter the confirmation code.

Under this approach, the confirmation code is specific to that event and a different confirmation code will be sent to the wireless device for the next event; or 3) sending the code currently stored on the read-write RFID to the venue and having the RFID reader at the venue "read" the RFID code stored in the membership ID tag. Under the third approach, the RFID reader will not only read the code stored in the RFID but also write back to the RFID tag with a new code. Prior to the event, the membership provider sends to the venue sponsor's system the code currently stored in the individual consumer's RFID tag and the new code to be written to the RFID tag, replacing the current code. When the consumer enters the venue, the consumer presents the RFID tag to the agent and the agent scans the RFID tag.

The RFID scanner "reads" the RFID code and verifies the RFID code currently stored in the RFID tag, matching it against the RFID list received from the membership provider. Upon successful verification, the scanner writes the new code received from the membership provider for that individual consumer to the consumers' RFID tag and authorizes the release of the ticket, allowing the consumer to enter the venue. At the next event, that new code will be used to authenticate the consumer's electronic ticket and authorize the release of the electronic ticket for that next event. Also, another code will be written to the RFID tag, replacing the new code, for the purpose of authentication for the following event. It is conceivable that the membership provider does not send the new code to the venue sponsor's system. In this case, the venue sponsor's system will generate the new code, encode the RFID tag with the new code, and send the new codes to the membership provider.

Periodically, like once a day, the service provider's Consumer Purchasing Behavior Analytic system 702 launches the adaptive neural networks application 705, which retrieves recent ticket purchasing data from the Consumer Profile database 720 and uses them as data points for its training, testing, and validating data sets. The neural networks application 705 uses the data points to analyze the consumer purchasing behavior and purchasing decision process. The results will be stored in the Consumer Profile database 720.

Today's neural networks systems that are designed to analyze consumer purchasing behavior don't have the self-enhancing capability. When these systems are initially set up, they receive training, testing, and validating data sets that are reflective of their current environment. Their recommendations, at that time, are fairly accurate. As time goes by, the consumers' tastes, preferences, life styles, and purchasing behaviors change. The data sets in these neural networks become stale and the recommendations provided by these systems become less accurate. Due to high cost of setting up and obtaining new data sets for these systems, these systems are often not replaced. Advertisers who continue to use these systems often design marketing campaigns that are, for the most part, completely ineffective.

The current invention on wireless ticket distribution and redemption system collects a volume of consumer purchasing behavior data on a daily basis and, therefore, can provide the neural networks system with fresh data sets, allowing the neural networks system to keep up with changing market conditions and trends. This gives the system unparalleled ability to provide accurate recommendation on marketing campaigns, which cannot be accomplished with prior art systems.

Another key differentiator of this system over prior art systems is the amount and level of detail of the profile data being collected. Today's advertising campaigns use the fire-and-forget model. Advertisers don't have a way to accurately track what happens to their ads. Advertisers don't have the ability to observe what the consumers did with their ads. They cannot tell whether the consumers throw the ad away upon receiving it, open the ad and read the advertising message before throwing the ad away, or open the ad and read the advertising message and then save the ad.

The current invention can accurately track what the consumers did with the ad. The current invention combines the Mobile Ticket Distribution 735 and Mobile Cookie 730 applications to provide a 360 degree view of the consumers' purchasing decision process. The Mobile Ticket Distribution application 735 tracks which show information were sent to the consumers, the advertising message, and the discount level. The Mobile Cookie application 730 observes which discounts were used and which discounts were rejected. Together, these two applications provide deep insight into the consumers' purchasing decision process that is not achievable with prior art systems.

The advantage of using the wireless ticket distribution and redemption system is obvious. The system eliminates the printing and distribution of paper tickets, which enable tickets to be sold up to the start of the show. The system also enables discrete discounting of ticket price. Additionally, by using the consumer purchasing behavior to provide personalized discount and advertising messages, the venue sponsors increase the odds of selling potentially unsold tickets up to the last minute. This can not be accomplished with prior arts. The consumers receive convenience of always-available tickets, financial savings, and transaction efficiency. For venue sponsors, it provides greater understanding of consumer purchasing behavior, more flexible marketing capability, and revenue recovery from potentially unsold tickets. This also allows the venue sponsors to launch more personalized incentive programs, which maximize profit margins. The system also allows venue sponsors to make immediate adjustment to promotion programs currently underway in order to achieve the desired marketing effect.

Third Implementation

In wireless mobile commerce, certain conceivable requirements demand the capability to control and monitor behaviors of the handset subscriber especially those that can be captured by the user interface of the handset. The challenge in addressing these requirements mainly lies in the area of finding a cost effective solution given the environment of the wireless consumer market.

From an advertiser's perspective, it is advantageous to have the ability to display an ad on the consumers' wireless communication devices without requiring the consumer to initiate the ad viewing process and to observe in real-time the consumers' responses to the targeted ads. From the consumer's perspective, it is imperative that the ad notification is not intrusive. In other words, the ad should not arrive when the consumer is using the phone; and if the ad arrives when the consumer is using the phone, the ad should not be displayed until after the consumer hangs up.

The present invention describes a solution that displays advertising messages in a non-intrusive manner and provides immediate feedback to advertisers on the consumers' responses advertising messages. Although the terms used in this solution are specific to GSM cellular infrastructure platform, the general concept can be applied to other wireless platforms such as Time Division Multiple Access (TDMA), Code Division Multiple Access (CDMA), WCDMA, and Smart Phones.

As described in FIG. 8, the process begins with the membership service provider 830 deploying a Mobile Cookie application 848 (usually relatively small) that can reside on the Subscriber Identity Module (SIM) card 872 of a GSM phone 870. For convenience, this document will refer to this small SIM card based application as the Mobile Cookie application 848. However, similar process applies to other non-GSM mobile phones. The Mobile Cookie application 848 is used to manage all communications between the mobile phone 870 and the membership service provider's system 830. The Mobile Cookie application 848 can be deployed using Over The Air (OTA) provisioning technique. The detail of this process is apparent to those well versed in the art.

Once deployed on the SIM card 872, the Mobile Cookie application 848 will register with the mobile phone's operating system (or other mobile equipment) 878 and request the operating system 878 to forward all messages with specific headers and/or message types to the Mobile Cookie application 848.

When an ad sent by the membership service provider 830 arrives at the consumer's mobile phone 870, the mobile phone's operating system (or other mobile equipment) 878 recognizes that this message is intended for the Mobile Cookie application 848 and forwards the ad to the Mobile Cookie application 848. The Mobile Cookie application 848 checks if the consumer is using the mobile phone 870 and launches the Mobile Advertising application 850 if the consumer is not using the mobile phone 870. The Mobile Advertising application 850 checks the ad message and determines which technology 864 (Short Message Service (SMS), Multimedia Messaging Service (MMS), Java 2 Platform Micro Edition (J2ME), Binary Runtime Environment for Wireless (BREW), Wireless Application Protocol (WAP), or Wireless Application Protocol (WAP) Push) was used to send the ad and the instruction 866 for retrieving and displaying the ad. The Mobile Advertising application follows the instruction 860 and displays the ad. Below is a detailed example of how the Mobile Advertising application 850 uses the instruction 860 to display the advertising message. The example uses WAP technology. However, the same process applies to other technologies, including SMS, MMS, J2ME, BREW, WAP Push, and other technologies that will become available in the future.

This solution focuses primarily on utilizing the two key features on existing mobile units including the Subscriber Identity Module (SIM) and WAP browser, although the solution can apply to other technologies such as SMS, MMS, J2ME, and BREW. Incorporating the SIM in this solution provides certain capabilities that would otherwise be considered relatively intrusive, impractical, and/or costly to implement.

There are many advantages in utilizing the WAP browser technology to display ads on the mobile phone, including graphical capability, standardized technology, advanced user interface, market penetration of mobile phones supporting WAP, and more.

Under normal circumstance, the WAP browser can only be launched by a user initiated command. In this solution, the WAP browser shall be launched without the user having to initiate the sequence of opening it. In response, certain events such as the standard mobile phone key pad can be monitored, logged, and sent back to the application server.

In this application, a typical sequence of interaction is as followed:

An advertiser 820 logs in to a secured and restricted web-based application 840 (advertising content database) via a browser or a customized client program to upload an ad and select a targeted consumer group for distribution.

The matching engine 842 uses a heuristic matching technique to match the consumers' profiles of the Consumer Profile database 844 to the filtering conditions specified in the incentive program 826 provided by the advertiser 820 and forwards the ads and list of mobile phone number of the mobile phone 870 of the consumers whose profiles fit the filtering conditions specified in the ads to the Mobile Ads Distribution application 846.

The Mobile Ads Distribution application 846 composes a SMS message 862 with a specific Wireless Application Protocol Uniform Resource Locator (WAP URL) uniquely assigned to every ad in the distribution queue and requests the SMS gateway component 852 to send the SMS message 862 to every phone number associated with the respective distribution list.

The SMS message 862 sent in step 3 must have the protocol identifier=SIM data download, and data coding scheme=class 2 message. Refer to third Generation Partnership Project (3GPP) 31.111 for reference. The SMS message 862 shall utilizes the Short Message Service/Point-to-Point (SMS PP) service (GSM 04.11) on the Stand-alone Dedicated Control CHannel (SDCCH) or Slow Associated Control CHannel (SACCH).

The SMS gateway component 852 shall use the service of a third-party "SMS Center" 868 to forward the SMS message 862 to a cellular network for transmission. Utilizing a "SMS Center" maximizes distribution coverage since it typically is connected to different cellular provider networks. The "SMS Center" 868 sends the SMS message transmission request to various networks depending on the mobile phone's wireless carriers. Once in the queue of a wireless network, the transmission of the SMS message 862 follows the same routine of typical SMS service.

When the SMS message is received by the mobile equipment 878, it is immediately forwarded to the Mobile Cookie application 848 since it has been identified as a SIM data download message. Note that the term mobile equipment 878 is used to identify the part of the mobile phone 870 minus the SIM card 872.

Prior to receiving the SMS data download indication from the mobile equipment 878, the Mobile Cookie application 848 must register with the mobile equipment 878 regarding notification in the case of such an event (e.g. the service "data download via SMS-PP" must be allocated and activated in the SIM Service Table). See 3GPP 31.111. Once the Mobile Cookie application 848 received the SMS data download message 862, it shall acknowledge the mobile equipment 878 following the procedure specified in 3GPP 31.111.

Inside the SMS message 862 received by the Mobile Cookie application 848 is a sequence of bytes describing the URL of the ad to be retrieved. The Mobile Cookie application 848 shall request a browser inside a browser-enabled mobile equipment 878 to interpret the content corresponding to that URL via the LAUNCH BROWSER command (see 3GPP 31.111).

If the mobile equipment 878 does not reject the LAUNCH BROWSER request, a WAP browser is launched to retrieve the content of the given URL. If the mobile phone 870 is a flip phone, the display module is likely to be disabled, thus causing the mobile equipment 878 to reject the LAUNCH BROWSER request. If the ad message is time sensitive, the Mobile Cookie application 848 can launch a request to the mobile equipment 878 to "wake up" by causing the mobile phone 870 to ring or vibrate to let the consumer knows that an urgent ad message has arrived. It is conceivable in a Mobile Cookie application design that certain mobile equipment 878 events such as any key pressed (e.g. Dual Tone Multi Frequency (DTMF)) is used as a secondary trigger to initiate the LAUNCH BROWSER request after the URL has been retrieved.

The WAP Gateway on the cellular carrier network is contacted by the mobile phone 870 to get the content of the URL. The WAP Gateway directs the URL request to the Mobile Ads Distribution application 846. By design, the Mobile Ads Distribution application 846 is also a web service component on the "Application Server" which terminates the URL request from the WAP Gateway, The Mobile Ads Distribution application 846 shall have communication to the distribution component to obtain the ad information in the queue. Once the ad content is obtained, the Mobile Ads Distribution application 846 responds to the Uniform Resource Locator (URL) request with a Wireless Markup Language (WML) page containing the ad content.

The WAP Gateway receives the response from the URL request it made and returns the WML content to the mobile phone 870 requesting the page. Once the mobile phone 870 receives the complete WML page, the ad is displayed on the mobile phone's screen through a WAP browser. At this point, the subscriber shall see the ad displayed on the mobile phone 870. After the Mobile Cookie application 848 successfully requested the activation of the mobile equipment browser, it shall poll for the log a specified number of Dual Tone Multi Frequency (DTMF) or soft-key events.

Once a timer expires or the number of events to be logged has been reached, the Mobile Cookie application 848 shall compose an SMS message containing an email like address, ad identification and the logged events and request the mobile equipment 878 to send the SMS message to a special dedicated number identifying the email server supported by the network. The transaction between the mobile phone 870 and the network starts out as an SMS PP transaction. It is then transformed into an email message by the email gateway on the cellular network. Finally, the email is sent through the internet to the Mobile Cookie Interface 858. The collection of emails gathered at the Mobile Cookie Interface application 858 is stored in the Consumer Profile database for data mining and analysis by the membership service provider 830.

The steps above describe the process of using the SIM card application as a Mobile Cookie. The process describes how the Mobile Cookie application works with a WAP application. The Mobile Cookie can use the same process for other technologies such as SMS, MMS, J2ME, BREW, WAP Push to provide non-intrusive ad viewing experience to the consumers and collect detailed consumer's responses to ad messages and discount offers. While the process above mentions the use of a SIM card on a GSM phone, the Mobile Cookie can also be a program written into a CDMA chip or residing at or right above the CDMA operating system that serves the same purpose. The latter approach is similar to deploying an applet in the browser environment. The current invention focuses on designing and deploying "applets" on wireless devices that can be used to monitor consumers' responses to advertising messages. Similarly, the Mobile Cookie can also be a program that resides at or right on top of the TDMA operating system and Smart Phone operating system.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. For use with a server system comprising a consumer profile database for storing consumer information, a content database for storing content, and a distribution module for wirelessly transmitting content from the content database to mobile devices of consumers identified using the consumer profile database, a consumer mobile device comprising:
a memory storage device;
circuitry for receiving, storing, and displaying content transmitted by the server system;
a processor;
an operating system executable by the processor, the operating system interacting with a program registry and being configured to identify incoming messages with headers or message types or both headers and message types specified by a program identified in the registry; and
a program, executable by the processor, for recording an interaction with the content using the mobile device, wherein (i) the program for recording an interaction is registered with the operating system and (ii) the registration specifies process-relevant messages in terms of header, message type or both header and message type, whereby the operating system is operative to forward only process-relevant messages to the program for recording an interaction during execution thereof by the processor.

2. The mobile device of claim 1, wherein the program for recording an interaction resides above the operating system.

3. The mobile device of claim 1, wherein the processor is further configured to cause transmission, to the server system, of data representative of the interaction.

4. The mobile device of claim 1, wherein the program for recording an interaction resides in the memory storage device.

5. A consumer mobile device comprising:
a memory storage device;
circuitry for receiving, storing, and displaying content transmitted by a server system, wherein the server system comprises a consumer profile database for storing consumer information, a content database for storing content, and a distribution module for wirelessly transmitting content from the content database to mobile devices of consumers identified using the consumer profile database; and
a processor for executing (i) an operating system and (ii) a program for recording an interaction with the content using the mobile device, wherein (A) the operating system is configured to interact with a program registry and to identify incoming messages with headers or message types or both headers and message types specified by a program identified in the registry, and (B) the program for recording an interaction is registered with the operating system and the registration specifies process-relevant messages in terms of header, message type or both header and message type, whereby the operating system is operative to forward only process-relevant messages to the program for recording an interaction during execution thereof by the processor.

6. The mobile device of claim 5, further comprising circuitry for transmitting, to the server system, data representative of the interaction.

7. The mobile device of claim 5, wherein the program for recording an interaction resides in the memory storage device.

* * * * *